United States Patent
Kanayama

(10) Patent No.: US 8,478,122 B2
(45) Date of Patent: Jul. 2, 2013

(54) IMAGE TAKING SYSTEM

(75) Inventor: Masaomi Kanayama, Saitama (JP)

(73) Assignee: Canon Kabushiki Kaisha (JP)

( * ) Notice: Subject to any disclaimer, the term of this patent is extended or adjusted under 35 U.S.C. 154(b) by 23 days.

(21) Appl. No.: 13/209,508

(22) Filed: Aug. 15, 2011

(65) Prior Publication Data

US 2012/0051728 A1    Mar. 1, 2012

(30) Foreign Application Priority Data

Aug. 31, 2010   (JP) ................. 2010-194626

(51) Int. Cl.
  *G03B 17/00*   (2006.01)
  *G03B 35/00*   (2006.01)
(52) U.S. Cl.
  USPC ............................. 396/325; 396/55
(58) Field of Classification Search
  USPC .................................... 396/55, 325
  See application file for complete search history.

(56) References Cited

U.S. PATENT DOCUMENTS

| | | | |
|---|---|---|---|
| 2005/0276590 A1* | 12/2005 | Ishikawa et al. | 396/55 |
| 2008/0239064 A1* | 10/2008 | Iwasaki | 348/47 |
| 2011/0007133 A1* | 1/2011 | Imanishi | 348/42 |
| 2011/0085788 A1* | 4/2011 | Pace et al. | 396/325 |
| 2011/0299163 A1* | 12/2011 | Matsuura | 359/557 |

FOREIGN PATENT DOCUMENTS

JP    2007033624 A    2/2007

* cited by examiner

*Primary Examiner* — Clayton E LaBalle
*Assistant Examiner* — Noam Reisner
(74) *Attorney, Agent, or Firm* — Rossi, Kimms & McDowell LLP

(57) ABSTRACT

An image taking system includes an optical path splitting element that splits beams coming from an object into transmitted beams and reflected beams and first and second lens apparatuses into which the two bundles of beams split by the optical path splitting element enter. Each of the first and second lens apparatuses has an image blur reduction unit that shifts an object image in a direction perpendicular to the optical axis, a vibration detector that detects vibration of the lens apparatus, a command signal generator that generates a command signal for driving the image blur reduction unit, a driving unit that drives the image blur reduction unit, and a communication unit that sends/receives image stabilization information to/from the other lens apparatus. The command signal generator of the second lens apparatus generates a command signal based on the image stabilization information obtained from the first lens apparatus through the communication unit.

8 Claims, 8 Drawing Sheets

IMAGE TAKING SYSTEM

BACKGROUND OF THE INVENTION

1. Field of the Invention

The present invention relates to an image taking system, in particular to an image taking system that takes an image using two lens apparatuses.

2. Description of the Related Art

There have been developed image taking systems that obtain a stereoscopic image by taking parallax images corresponding to right and left eyes using two image taking apparatuses arranged side-by-side. The distance between the optical axis of the image taking apparatus corresponding to the right eye and the optical axis of the image taking apparatus corresponding to the left eye is designed basically to be 65 millimeters (which is approximately equal to the distance between the human eyes). However, in some cases, the shape and size of the image taking apparatuses may prevent the apparatuses to be arranged with a desired distance between the optical axes thereof. In view of this, an image taking system in which image taking apparatuses are arranged respectively above and behind a half mirror to take images has been developed.

FIG. 8 shows the outer appearance of the image taking system. FIG. 8 is a side view showing the system including lens apparatuses 1A and 1B having the same specifications, cameras 2A and 2B having the same specifications, a half mirror 3 and a camera platform 4 that supports the lens apparatuses 1A, 1b, cameras 2A, 2B and the half mirror 3. The lens apparatus 1A and the camera 2A are oriented horizontally, and beams coming from an object are transmitted through the half mirror 3 and enter the camera 2A through the lens apparatus 1A. The optical axes of the lens apparatus 1A and the lens apparatus 1B are arranged to be positioned in planes spaced apart from each other by approximately 65 millimeters (which is equal to the distance between the human eyes) in the direction perpendicular to the plane of the drawing sheet. The lens apparatus 1B and the camera 2B are oriented vertically, and beams coming from the object are reflected by the half mirror 3 and enter the camera 2B through the lens apparatus 1B. The lens apparatus 1A and the camera 2A are used to take a right eye image and the lens apparatus 1B and the camera 2B are used to take a left eye image, for example. Such a vertical arrangement enables flexible adjustment of the distance between the two image taking apparatuses on a half mirror surface without being affected by the shape and size of the image taking apparatuses.

Movable optical members such as magnification-varying mechanisms, focus adjustment mechanisms and image stabilization mechanisms in the respective two lens apparatuses used in such an image taking system for stereoscopic image are controlled in synchronization to make the optical conditions in the two lens apparatuses always identical to each other.

Japanese Patent Application Laid-Open No. 2007-33624 discloses a lens system for a stereoscopic camera in which two lens apparatuses use a vibration detector in common, and image stabilization units in the respective lens apparatuses perform image blur correction based on the vibration of the vibration detector, enabling a reduction in the difference in image stabilization characteristics between the two lens apparatuses.

In the prior art system disclosed in the aforementioned patent document, one vibration detector is used in common to detect the vibration of the two lens apparatuses, and each lens apparatus does not have a vibration detector. Therefore, each lens apparatus cannot perform image blur correction by itself. Nevertheless, a lens apparatus having an image stabilization function that can be used alone might sometimes be diverted for taking two-dimensional image. Therefore, it is desirable that the lens apparatus itself be equipped with a vibration detector to allow image blur correction by the lens apparatus alone. In other words, arrangement of a stereoscopic image taking system using two existing lens apparatuses for two-dimensional image taking each having an image stabilization function will eliminate the need for the preparation of special lens apparatuses. Thus, a versatile stereoscopic image taking system can be produced at low cost. However, in the case of the above-described image taking scheme in which a lens apparatus is arranged vertically with the use of a half mirror, the vibration detection axis of the vibration detector in the lens apparatus that is oriented vertically (i.e. the lens apparatus into which the beams reflected by the half mirror enter) will change. In consequence, image blur correction performed based on the vibration detected by the vibration detector equipped in the lens apparatus vertically oriented cannot be satisfactory.

SUMMARY OF THE INVENTION

In view of the above, an object of the present invention is to provide a stereoscopic image taking system using two lens apparatuses each having an image stabilization function in which the image stabilization functions of both lens apparatuses can be enabled.

To achieve the above object, an image taking system according to the present invention comprises an optical path splitting element that splits beams coming from an object into transmitted beams and reflected beams and first and second lens apparatuses into which the two bundles of beams split by the optical path splitting element enter, wherein each of the first and second lens apparatuses comprises an image blur reduction unit that shifts an object image in a direction perpendicular to the optical axis to reduce image blur, a vibration detector that detects vibration of the lens apparatus, a command signal generator that generates a command signal for driving the image blur reduction unit, a driving unit that drives the image blur reduction unit based on the command signal, and a communication unit that sends/receives image stabilization information generated by the vibration detector to/from the other lens apparatus, and the command signal generator of the second lens apparatus generates a command signal based on the image stabilization information obtained from the first lens apparatus through the communication unit.

The present invention can provide a stereoscopic image taking system using two lens apparatuses each having an image stabilization function in which the image stabilization functions of both lens apparatuses can be enabled.

Further features of the present invention will become apparent from the following description of exemplary embodiments with reference to the attached drawings.

DESCRIPTION OF THE EMBODIMENTS

Figure 1:
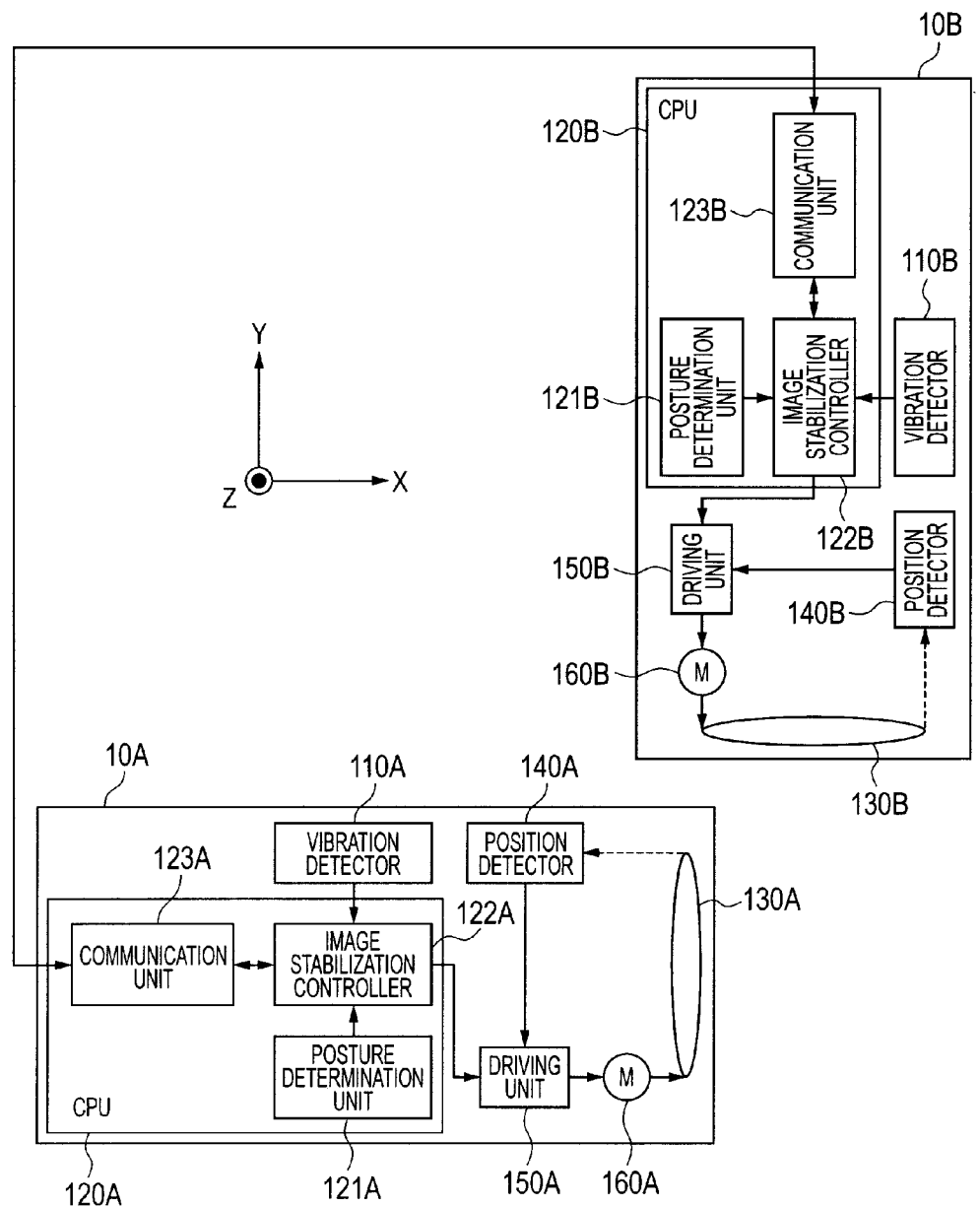
FIG. 1 is a block diagram of an image taking system according to a first embodiment of the present invention.

Preferred embodiments of the present invention will now be described in detail in accordance with the accompanying drawings. FIG. 1 shows an image taking system according to an embodiment of the present invention.

First Embodiment

In the following, an image taking system according to a first embodiment of the present invention will be described with reference to FIGS. 1 to 3.

The lens apparatus used in the image taking system according to the present invention includes a first lens apparatus and a second lens apparatus. Beams coming from an object are split into transmitted beams transmitted through a half mirror and reflected beams reflected by the half mirror. The beams transmitted through the half mirror enter the first lens apparatus, and the beams reflected by the half mirror enter the second lens apparatus. In the following description of the invention, a half mirror is used as an example of the optical path splitting element that splits the optical path. However, the present invention is not limited by this, and any element that can split the optical path may be used. In any case, each of the two split beams resulting from the beam splitting by the optical path splitting element will enter the first and second lens apparatuses respectively.

FIG. 1 is a block diagram of the image stabilization units provided in the first and second lens apparatuses.

The image taking system according to this embodiment includes the image stabilization unit 10A of the first lens apparatus and the image stabilization unit 10B of the second lens apparatus. The first and second lens apparatuses in the first embodiment have the same specifications, and the components of the image stabilization units 10A and 10B are the same. Here, the two lens apparatuses that have the same specification each other do not need to be constituted by the completely same parts, and need to be the same each other at least in terms of the presence or absence of functions such as image stabilization, magnification-varying and focusing. More preferably, the two lens apparatuses have the same mechanism of the image stabilization at the same positions in the two lens apparatuses; the lens units move in the direction of the optical axis during magnification-varying (further, the moving amounts of the two lens apparatuses are the same each other); and the positions of the lens units of the two lens apparatuses which move in the direction of the optical axis during focusing are the same each other (further, the moving amounts of the lens units are the same each other). The same components are denoted by the same reference numerals. In the following description, in the case where it is necessary to specifically distinguish the components of the first lens apparatus and the components of the second lens apparatus, the suffix "A" will be used to denote the components of the image stabilization unit 10A and the suffix "B" will be used to denote the components of the image stabilization unit 10B. In the following, the image stabilization unit 10A will be mainly described by way of illustration.

The image stabilization unit 10A has a vibration detector 110A, which detects the vibration of the lens apparatus (not shown). The vibration detector 110A is composed, for example, of two angular velocity sensors, which detect vibration in the first or horizontal direction (which will be hereinafter referred to as the H direction) in the image plane that is perpendicular to the optical axis and vibration in the second direction or vertical direction (which will be hereinafter referred to as the V direction) respectively. The image stabilization unit 10A has a CPU 120A, which includes a posture determination unit 121A that constitutes the installing direction determination unit, an image stabilization controller 122A that constitutes the command signal generator and a communication unit 123A. The posture determination unit 121A determines whether the optical axis of the lens apparatus A that includes the image stabilization unit 10A is parallel or perpendicular to beams coming from the object. The process of determining the parallel/vertical posture will be described later. The image stabilization controller 122A changes the image stabilization process based on the result of determination made by the posture determination unit 121A and generates a command signal for image blur correction. The process of generating the command signal will be described later. The image stabilization controller 122A is connected with the image stabilization unit 10B through the communication unit 123A to send and receive image stabilization information. Here, the image stabilization information is generated by the vibration detector of each of the lens apparatuses and sent to the other lens apparatus. The image stabilization information may be information (or signal) which represents the vibration itself detected by the vibration detector, or information which is generated based on the vibration detected by the vibration detector. The image stabilization unit 10A also has an image blur correction lens 130A, which is a movable lens unit that can move in directions perpendicular to the optical axis to move the object image on the image plane in directions perpendicular to the optical axis, thereby reducing image blur. The image stabilization unit 10A also has a position detector 140A, which detects the position of the image blur correction lens 130A. The image stabilization unit 10A also has a driving unit 150A, which generates a driving signal based on the command signal from the image stabilization controller 122A and a position signal from the position detector 140A to drive the image blur correction lens 130A by a motor 160A.

The image stabilization unit 10A achieves image stabilization with the above-described configuration.

The first lens apparatus into which the beams coming from the object and transmitted through the half mirror enter is arranged in such a way that its optical axis is oriented substantially horizontally. The second lens apparatus into which the beams coming from the object and reflected by the half mirror enter is arranged in such a way that its optical axis is oriented substantially vertically.

The components in the image stabilization unit 10B are the same as those in the image stabilization unit 10A and will not be described further. However, only the vibration detector 110B is in a different situation, which will be described in the following.

Since the optical axis of the first lens apparatus equipped with the image stabilization unit 10A is oriented substantially horizontally, the direction of one of the vibration detection axes or the H direction of the image stabilization unit 10A is parallel to the Z axis direction (first direction) in FIG. 1 and the direction of the other vibration detection axis or the V direction of the image stabilization unit 10A is parallel to the Y axis direction (second direction) in FIG. 1. In this embodiment, since the optical axis of the second lens apparatus equipped with the image stabilization unit 10B is oriented substantially vertically, the H direction of the image stabilization unit 10B is parallel to the Z axis direction (first direction) in FIG. 1 and the V direction of the image stabilization unit 10B is parallel to the X axis direction (third direction) in FIG. 1. In the case of the image stabilization unit 10B, beams coming from the object are reflected by the half mirror to deflect by 90 degrees and enter the lens apparatus. Consequently, although it is possible to drive the image blur correction lens 130B in the X axis direction to correct image blur for image stabilization with respect to the V direction in the image stabilization unit 10B, it is impossible for the vibration detector 110B to detect the vibration in the direction corresponding to the V direction (i.e. the vibration in the Y axis direction) in the image stabilization unit 10B because the direction of the vibration of the lens apparatus that causes this image blur is actually parallel to the Y axis direction. In consequence, the image stabilization unit 10B cannot perform by itself image blur correction with respect to the V direction. Therefore, the image stabilization unit 10B obtains image stabilization information with respect to the Y axis direction from the image stabilization unit 10A through the communication unit 123B to enable image blur correction. Details of the image blur correction process will be described later.

Figure 2:
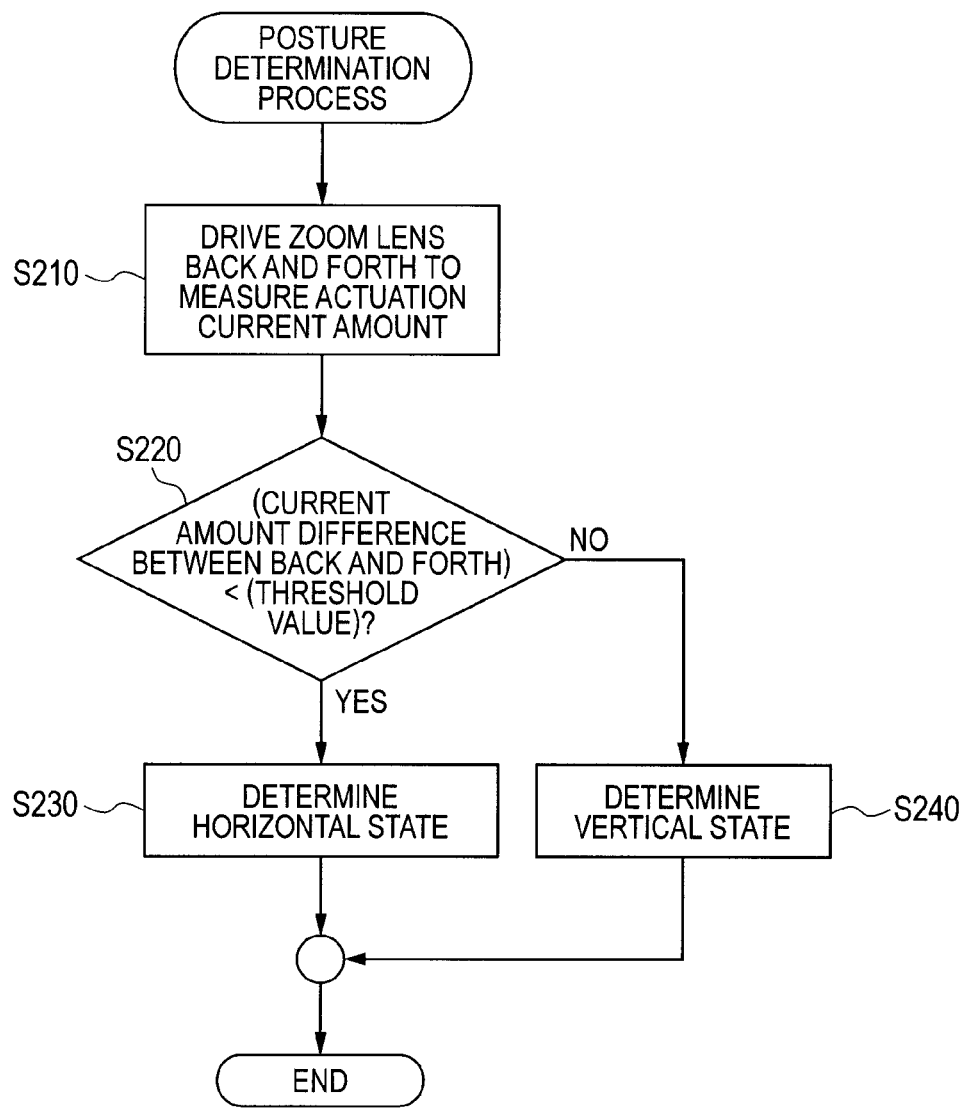
FIG. 2 is a flow chart of a posture determination process in the first embodiment.

FIG. 2 is a flow chart of a process executed in the posture determination units 121A, 121B to determine whether the posture of installation of the lens apparatus is horizontal or vertical.

In this embodiment, there will be described a process of automatically determining whether the lens apparatus is in a horizontal posture or in a vertical posture by driving a movable optical component or a zoom lens provided in the lens apparatus.

As the power supply to the lens apparatus is turned on, the process proceeds to step S210, where the zoom lens in the lens apparatus is driven back and forth and the actuation current amount during the back-and-forth driving is measured. Then, the process proceeds to step S220, where a determination is made by comparison as to whether the difference in the current amount measured in step S210 between opposite driving directions (which difference will be hereinafter referred to as the "forward-backward difference") is larger than a threshold value or not. This threshold value is set to be equal to the largest value of the forward-backward difference in the actuation current amount that may be reached while the zoom lens is driven back and forth when the lens apparatus is in the horizontal posture. If the difference is smaller than the threshold value, the process proceeds to step S230. If the difference is larger than the threshold value, the process proceeds to step S240. In step S230, it is determined that the lens apparatus is in the horizontal posture (which means that the beams transmitted through the half mirror enter this lens apparatus). In step S240, it is determined that the lens apparatus is in the vertical posture (which means that the beams reflected by the half mirror enter this lens apparatus).

When the optical axis of the lens apparatus is oriented substantially vertically, the load of driving of a movable optical member such as the zoom lens that is driven along the optical axis during forward driving and that during backward driving differ largely due to the effect of the gravity. Specifically, if the direction of driving for zooming from telephoto side to wide angle side, for example, is the same as the direction of the gravity, the driving load during zooming from telephoto side to wide angle side will be small, and the actuation current amount during such zooming will also be small. Conversely, the driving load during zooming from wide angle side to telephoto side will be large, and the actuation current amount during such zooming will also be large. Consequently, the forward-backward difference in the actuation current amount caused by the change in the driving direction is larger in the vertical posture than in the horizontal posture. Therefore, setting the threshold value equal to the largest value of the forward-backward in the actuation current amount that may be reached in the horizontal posture enables the determination as to whether the lens apparatus is in the horizontal posture or in the vertical posture.

Although in this embodiment the determination of the installing direction is made by driving the zoom lens, it should be understood that the present invention is not limited by this particular method of determination. Any lens unit that can move along the optical axis may be used for the posture determination in place of the aforementioned zoom lens. For example, a focusing lens may be driven in a similar manner to determine the posture of the lens apparatus.

Although in this embodiment the posture determination is made based on the forward-backward difference in the actuation current amount, it should be understood that the present invention is not limited by this particular method of determination. The determination may be made based on the absolute value of the actuation current amount. Since the actuation current amount differs between the horizontal posture and the vertical posture as described above, the determination as to the horizontal/vertical posture may be made by determining whether or not the actuation current amount falls within the range of possible actuation current amounts in the horizontal posture. Alternatively, the determination may be made based on the driving speed. The difference in the driving load between the horizontal posture and the vertical posture leads to a difference in the driving speed. Therefore, the determination as to the horizontal/vertical posture can be made by determining whether or not the driving speed falls within the range of driving speeds in the horizontal posture.

Although in this embodiment a description has been made of a method of determining the installing direction by driving a movable optical member in the lens apparatus, it should be understood that the present invention is not limited by this particular method of determination. An acceleration sensor may be provided in the lens apparatus, and the installing direction may be determined by detecting the direction of the gravity based on the output from the acceleration sensor.

Alternatively, an installing direction setting unit with which the installing direction can be set may be provided in the lens apparatus to allow a user to manually make a setting indicating whether the lens apparatus is in the horizontal posture or in the vertical posture. In this case, the installing direction determination unit (or the posture determination unit 121) can determine that the lens apparatus is in the horizontal posture (in the case of the first lens apparatus) or in the vertical posture (in the case of the second lens apparatus) from the status (of a switch or the like) set in the installing direction entry unit without execution of the posture determination process shown in FIG. 2.

Figure 3:
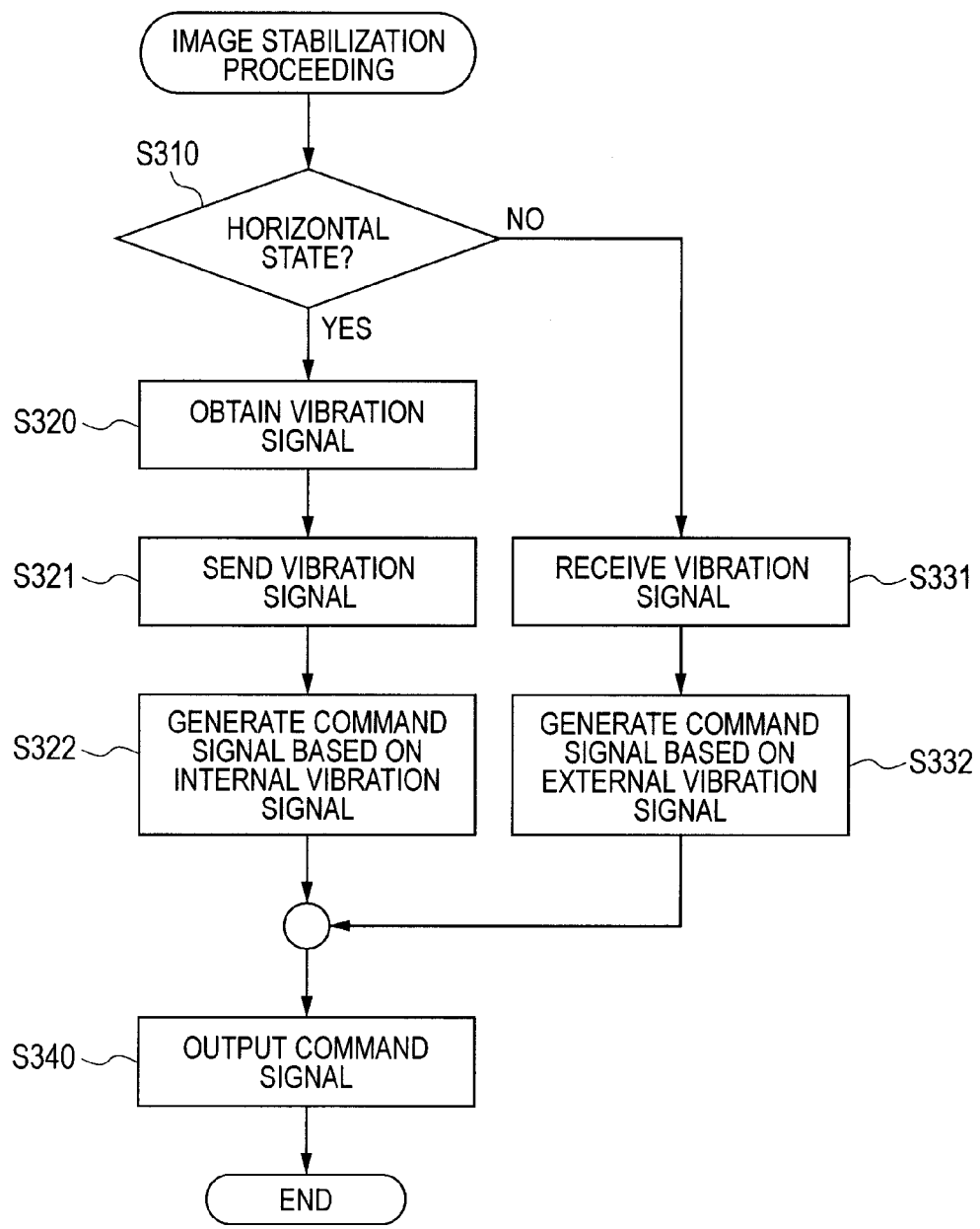
FIG. 3 is a flow chart of an image stabilization process in the first embodiment.

FIG. 3 is a flow chart of an image stabilization process executed in the image stabilization controllers 122A, 122B.

In this embodiment, there will be described a case in which image stabilization information communicated between the image stabilization unit 10A and the image stabilization unit 10B is a vibration signal output from the vibration detector 110A.

The processes in the CPUs 120A and 120B in the image stabilization units 10A and 10B are controlled according to respective computer programs stored in memories (not shown).

In the following, the process in the image stabilization unit 10A will be described by way of illustration.

As the image stabilization process is started, the process in the CPU 120A proceeds to step S310. In step S310, it is determined whether or not the installing direction of the lens apparatus determined by the posture determination unit 121A (which constitutes the installing direction determination unit) is the horizontal posture, as described above with reference to FIG. 2. The posture determination process described with reference to FIG. 2 may be executed only once upon turning on the power supply, or alternatively the installing direction determination process may be executed at regular intervals to update the installing direction. Still alternatively, the installing direction determination process may be executed in response to a command by the user. For example, the actuation current amount may be measured at the time when the zoom lens is driven in response to a user's operation to execute the installing direction determination process. If it is determined in step S310 that the lens apparatus is in the horizontal posture, the process proceeds to step S320. If it is determined in step S310 that the lens apparatus is in the vertical posture, the process proceeds to step S331. As above, the switching between two command signal generation processes in the CPU 120A is determined in accordance with whether the lens apparatus is in the horizontal posture or in the vertical posture.

First, the command signal generation process in the horizontal posture will be described. In step S320, a vibration signal is obtained from the vibration detector 110A. Then in step S321, the vibration signal obtained in step S320 is sent through the communication unit 123A to the other image stabilization unit 10B (specifically, to the communication unit 123B in the case of this embodiment). Then in step S322, based on the vibration signal of its own image stabilization unit (or internal vibration signal) obtained in step S320, a command signal for driving the image blur correction lens 130A to such a position as to cancel image blur caused by the vibration is generated.

Next, the command signal generation process in the vertical posture will be described. In step S331, a vibration signal is received through the communication unit 123A from the other image stabilization unit. Then in step S332, a command signal is generated based on the vibration signal from the other image stabilization unit (or external vibration signal) received in step S331 in a manner similar to step S322.

After the generation of the command signal, process proceeds to step S340. In step S340, the command signal thus generated is output to the driving unit 150A. The drive unit 150A generates a drive signal based on the difference between the command signal output from the image stabilization controller 122A and a position signal output from the position detector 140A and outputs the drive signal to the motor 160A, thereby driving the image blur correction lens 130A. The image stabilization process proceeds as above.

The processing of steps S310 to S340 is executed repeatedly at regular intervals.

In this embodiment, since the image stabilization unit 10A is in the horizontal posture, the command signal is generated by the process of steps S320 through S322 in this unit. On the other hand, in the image stabilization unit 10B, which is in the vertical posture, the command signal is generated by the process of steps S331 through S332. As has already been described with reference to FIG. 1, since the image stabilization unit 10B is in the vertical posture, the image stabilization unit 10B cannot perform by itself image blur correction. Therefore, the image stabilization unit 10B obtains a vibration signal output in the image stabilization unit 10A that is in the horizontal posture and performs image stabilization control based on this vibration signal as described above, thereby enabling image blur correction in the image stabilization unit 10B.

In this embodiment, there has been described a case in which image stabilization information communicated between the image stabilization unit 10A and the image stabilization unit 10B is a vibration signal output from the vibration detector 110A. But the process is not limited to this. For example the image stabilization information may be a command signal output by the image stabilization controller 122A or a position signal output by the position detector 140A.

Although in this embodiment the image stabilization unit 10B that is in the vertical posture performs image blur correction using the vibration signal generated by the vibration detector 110A in the image stabilization unit 10A, the process in the present invention is not limited to this. As has been described with reference to FIG. 1, although the vibration detector 110B in the image stabilization unit 10B cannot detect vibration in the V direction, it can detect vibration in the H direction. Therefore, the process may be configured to perform image blur correction using a vibration signal of the image stabilization unit 10A received through the communication unit 123B with respect to the V direction and to use a vibration signal output from its own vibration detector 110B with respect to the H direction.

Although a case in which the lens apparatus in the vertical posture is oriented downwardly has been described, the orientation of the lens apparatus is not limited to this. The above discussion also applies to a case in which the lens apparatus in the vertical posture is oriented upwardly.

In the above described embodiment, it is presumed that the first lens apparatus into which beams transmitted through the half mirror enter is installed in such a way that its optical axis is oriented substantially horizontally and that the second lens apparatus into which beams reflected by the half mirror enter is installed in such a way that its optical axis is oriented substantially vertically. However, the present invention is not limited by this arrangement. For example, even while the image taking system in which the two lens apparatuses are arranged in such a way that their optical axes are oriented respectively in the horizontal and vertical directions is being tilted, the lens apparatuses themselves can determine which of the two lens apparatuses is one into which beams coming from the object and transmitted through the half mirror enter and which of them is one into which beams coming from the object and reflected by the half mirror enter, based on the difference in the effect of the gravity during forward and backward driving of a lens element in the lens apparatus along the optical axis. Specifically, in step S220 of the installing direction determination process shown in FIG. 2, a conditional branch may be used to distinguish between cases where the absolute value of the elevation angle (i.e. the angle measured from the horizontal direction) of the direction toward the object is smaller than 45 degrees and cases where the absolute value of the elevation angle of the direction toward the object is larger than 45 degrees, and the image stabilization unit 10 of the lens apparatus may compare the difference in the current amount between opposite driving directions (or the forward-backward difference) measure in step S210 and a predetermined threshold value to determine whether the difference is larger than the threshold value or not. This process enables the determination of the installing direction of the lens apparatus. The threshold value is set to be equal to the largest value of the forward-backward difference in the actuation current amount that may be reached while the zoom lens is driven back and forth at the elevation angle of 45 degrees. When the elevation angle is smaller than 45 degrees and the forward-backward difference is smaller than the threshold value and when the elevation angle is larger than 45 degrees and the forward-backward difference is larger than the threshold value, it may be determined that beams coming from the object and transmitted through the half mirror enter this lens apparatus (which determination step corresponds to step S230). When the elevation angle is smaller than 45 degrees and the forward-backward difference is larger than the threshold value and when the elevation angle is larger than 45 degrees and the forward-backward difference is smaller than the threshold value, it may be determined that beams coming from the object and reflected by the half mirror enter this lens apparatus (which determination step corresponds to step S240). Thus, each lens apparatus can determine whether it is used as the first lens apparatus or as the second lens apparatus in the image taking system.

When the elevation angles of the first and second lens apparatuses are both equal to 45 degrees, the effects of the gravity acting on the elements in the respective lens apparatuses are the same. In this case, consequently, each lens apparatus cannot determine whether it is used as the first lens apparatus or as the second lens apparatus in the image taking system. In this case, the first lens apparatus and the second lens apparatus may exchange image stabilization information through the communication units and use a control logic that the image stabilization information (e.g. vibration signal, command signal, or position signal) having the lower absolute value among the two is adopted. This enables appropriate image stabilization process in the first and second lens apparatuses.

In the above described case, the three ranges of the elevation angle of the lens apparatus optical axis or below 45 degrees, equal to 45 degrees and above 45 degrees are introduced in making the determination. However, the conditional range of the elevation angle equal to 45 degrees may be expanded to a range in which the difference in the effect of the gravity acting on the first and the second lens apparatuses is small. This can enhance the reliability of the determination. For example, the range of the elevation angle may be divided into the following three ranges: below 40 degrees, not below 40 degrees and below 50 degrees, and not below 50 degrees.

Second Embodiment

In the following, an image taking system according to a second embodiment of the present invention will be described with reference to FIGS. 4 to 6.

In this embodiment, a method of determining the installing direction utilizing the fall of a lens in the direction of the gravity will be described as an alternative to the installing direction determination method described in the first embodiment. In the image stabilization process in this embodiment described in the following, vibration signals output from the vibration detectors 110A, 110B of both the lens apparatus in the horizontal posture and the lens apparatus in the vertical posture are used with respect to both the H and V directions, unlike with the first embodiment.

Figure 4:
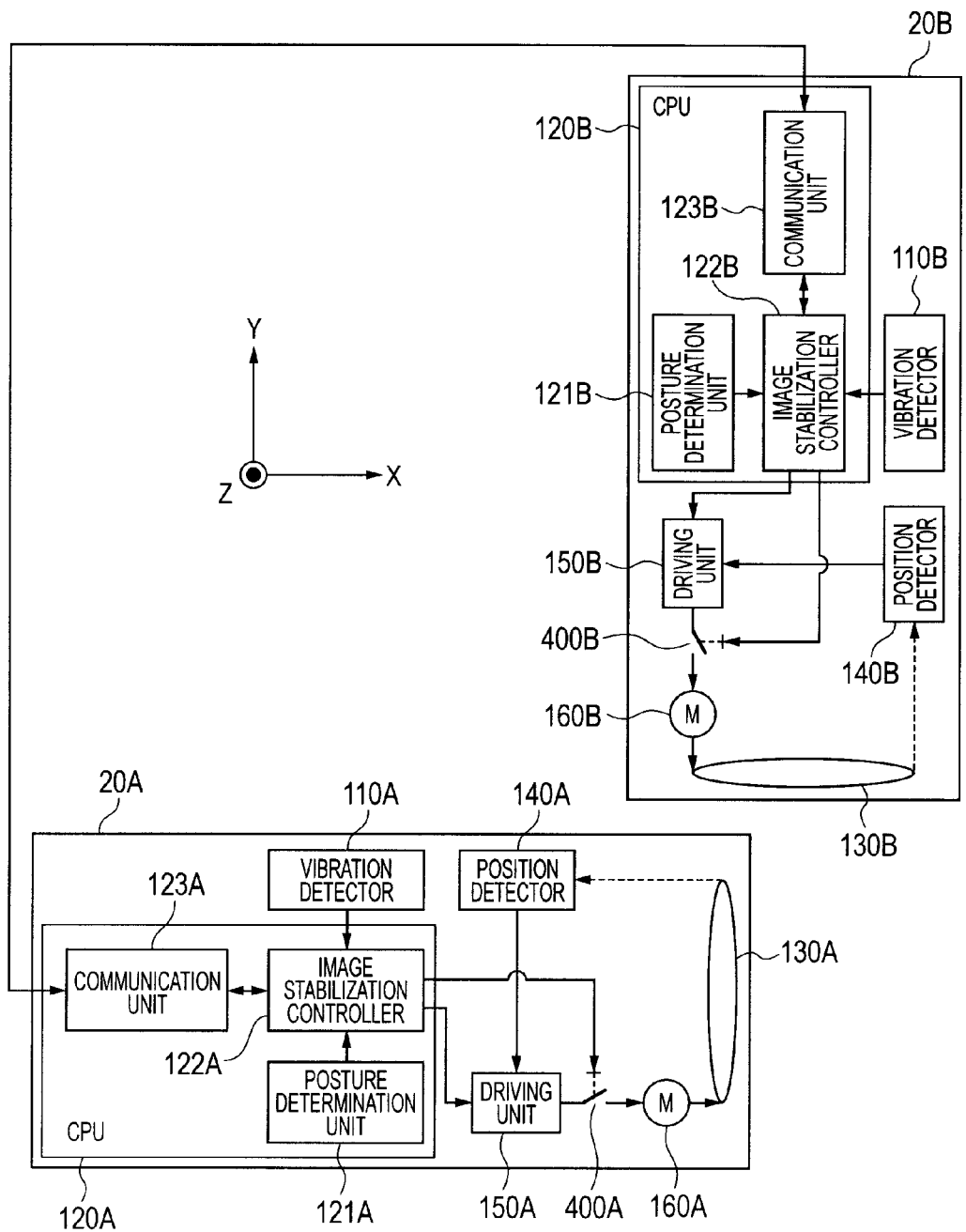
FIG. 4 is a block diagram of an image taking system according to a second embodiment of the present invention.

FIG. 4 is a block diagram of the image stabilization units provided in the lens apparatus in the horizontal posture and the lens apparatus in the vertical posture. The components same as those described in the first embodiment shown in FIG. 1 are denoted by the same reference numerals and will not be further described.

The image stabilization system shown in FIG. 4 includes an image stabilization unit 20A in a horizontal posture and an image stabilization unit 20B in the vertical posture. The lens apparatus in the horizontal posture and the lens apparatus in the vertical posture in this embodiment have the same specifications, and the respective image stabilization units 20A and 20B include the same components, accordingly. In the following, the image stabilization unit 20A will be mainly described by way of illustration.

An analogue switch 400A that constitutes the driving control stop unit is controlled by the image stabilization controller 122A to turn on/off the connection between the driving unit 150A and the motor 160A. During the image stabilization process, the analogue switch 400A is kept continuously on to drive the image blur correction lens 130A by the motor. During the installing direction determination process, the analogue switch 400A is turned off to shut down the power supply to the motor 160A, thereby achieving a state in which the actuation by the motor is disabled (which will be hereinafter referred to as the "motor free state"). This will be described in detail later.

Figure 5:
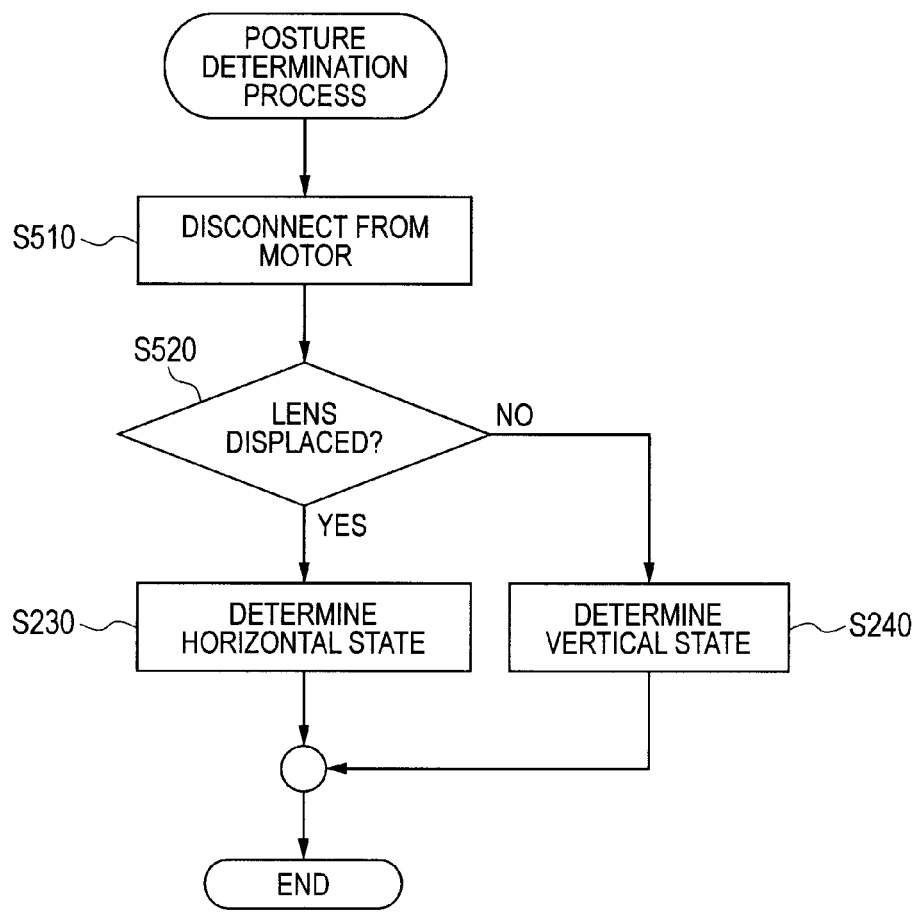
FIG. 5 is a flow chart of a posture determination process in the second embodiment.

FIG. 5 is a flow chart of a process executed in the posture determination units 121A, 121B to determine whether the lens apparatus is in horizontal posture or in the vertical posture.

The process steps same as those in FIG. 2 described in the first embodiment are designated by the same step numbers and will not be further described.

In the following, the process in the image stabilization unit 20A will be described by way of illustration. The following description also applies to the other image stabilization unit 20B.

As the power supply to the lens apparatus is turned on, the process proceeds to step S510, where the analogue switch 400A is turned off, the connection between the driving unit 150A and the motor 160A is disconnected to achieve the motor free state. Then in step S520, it is determined whether or not the shift from the motor connected state to the motor free state causes a displacement of the image blur correction lens 130A. If there is a displacement of the image blur correction lens 130A, the process proceeds to step S230, where it is determined that the lens apparatus is in the horizontal posture. On the other hand, if there is not a displacement of the image blur correction lens 130A, the process proceeds to step S240, where it is determined that the lens apparatus is in the vertical posture.

When the motor is in the connected state, the image blur correction lens 130A is located with its optical axis substantially coincident to the optical axis of the lens apparatus. The shift into the motor free state disables the actuation by the motor, and consequently the image blur correction lens 130A in the lens apparatus in the horizontal posture will displace because a direction in which the image correction lens 130A is displaceable coincides with the direction of the gravity. On the other hand, in the lens apparatus in the vertical posture, the direction of the gravity coincides with the optical axis direction, while the directions in which the image blur correction lens 130A is displaceable are in the plane perpendicular to the optical axis. In consequence, the image blur correction lens 130A will not displace. Therefore, the installing direction can be determined based on whether or not the image blur correction lens (shift optical element) 130A displaces upon the shift into the motor free state.

Although there has been described in this embodiment a case in which the installing direction is determined based on whether or not the image blur correction lens 130A displaces due to the gravity, the method of determination is not limited to this. For example, the determination may be made based on whether or not a zoom lens or a focus lens displaces. Since the direction in which the zoom lens and the focus lens are displaceable is the optical axis direction, if the lens displaces due to the gravity upon the shift into the motor free state, it may be determined that the lens apparatus is in the vertical posture; if the lens does not displaces upon the shift into the motor free state, it may be determined that the lens apparatus is in the horizontal posture.

Figure 6:
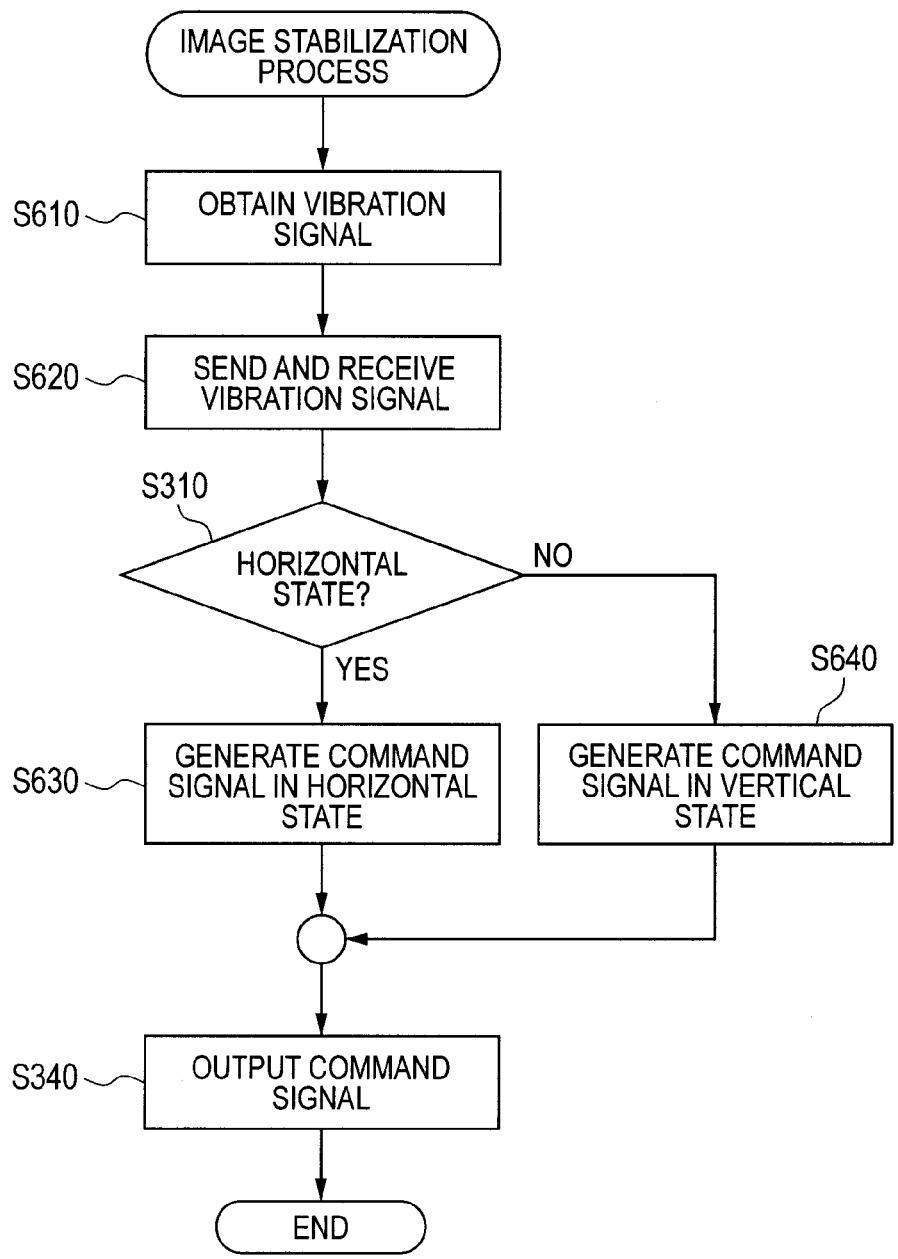
FIG. 6 is a flow chart of an image stabilization process in the second embodiment.

FIG. 6 is a flow chart of an image stabilization process executed in the image stabilization units 122A, 122B. The process steps same as those in FIG. 3 described in the first embodiment are designated by the same step numbers and will not be further described.

In this embodiment, there will be described a case in which vibration signals output from the vibration detectors 110A, 110B of both the lens apparatus in the horizontal posture and the lens apparatus in the vertical posture are used with respect to both the H and V directions.

The processes in the CPUs 120A and 120B in the image stabilization units 20A and 20B are controlled according to respective computer programs stored in memories (not shown).

In the following, the process in the image stabilization unit 20A will be described by way of illustration.

As the image stabilization process is started, the process in the CPU 120A proceeds to step S610. In step S610, a vibration signal is obtained from the vibration detector 110A. Then in step S620, the vibration signal obtained in step S610 is sent to the other image stabilization unit through the communication unit 123A and a vibration signal is obtained also from the other image stabilization unit. Then in step S310, the switching between command signal generation processes in the CPU 120A is determined in accordance with whether the lens apparatus is in the horizontal posture or in the vertical posture.

First, a command signal generation process in the horizontal posture will be described. In step S630, command signals are generated with respect to the V direction and the H direction respectively. With respect to the V direction, the command signal is generated based on the vibration signal of this image stabilization unit obtained in step S610 (or the internal vibration signal). With respect to the H direction, the command signal is generated based on both the vibration signal of this image stabilization unit obtained in step S610 (or the internal vibration signal) and the vibration signal of the other image stabilization unit received in step S620 (or the external vibration signal). For example, the two vibration signals may be averaged for use in the process of generating the command signal, or one of the two vibration signals that has the smaller absolute value may be chosen for use in the process of generating the command signal. The use of the vibration signals of the two image stabilization units enables a reduction in the image blur amount necessitated by noises in the vibration detectors 110A, 110B in image blur correction as compared to the case where the vibration signal of only one image stabilization unit is used.

Next, the command signal generation process in the vertical posture will be described. In step S640, command signals are generated with respect to the V direction and the H direction respectively. The command signals are generated based on both the vibration signal of this image stabilization unit obtained in step S610 (or the internal vibration signal) and the vibration signal of the other image stabilization unit received in step S620 (or the external vibration signal) with respect to the V direction and the H direction. For example, with respect to the V direction, both the vibration signals may be added up for use in the process of generating the command signal. The vibration in the V direction corresponds to the vibration in the Y axis direction in FIG. 4. If the camera platform (or the support member) on which the lens apparatuses are mounted is not so rigid, the lens apparatus in the vertical posture might vibrate also in the X direction. Therefore, the use of the vibration signal containing not only a vibration component in the Y direction but also a vibration component in the X direction will lead to an improvement in the image blur correction effect. Moreover, while the gravity acts downwardly in the V direction when the lens apparatus is in the horizontal posture, the gravity does not act in the V direction when the lens apparatus is in the vertical posture. Therefore, an additional feature that in the vertical posture the command signal is generated with a control gain smaller than that in the horizontal posture may be adopted. With respect to the H direction, a process using averaging or choice of the vibration signal having the smaller absolute value is used like in step S630.

As described above, the use of the vibration signals of both the image stabilization unit 20A and the image stabilization unit 20B enables effective and even improved image blur correction.

Third Embodiment

In the following, an image stabilization system according to a third embodiment of the present invention will be described with reference to FIG. 7.

In this embodiment, there will be described a case in which the two lens apparatuses have the same installing direction (i.e. having parallel optical axes).

The configuration of the image stabilization system and the install direction determination process in this embodiment are the same as those in the first embodiment illustrated in FIGS. 1 and 2 and will not be further described. It should be noted, however, that the image stabilization units 10A and 10B are arranged in the same installing direction.

Figure 7:
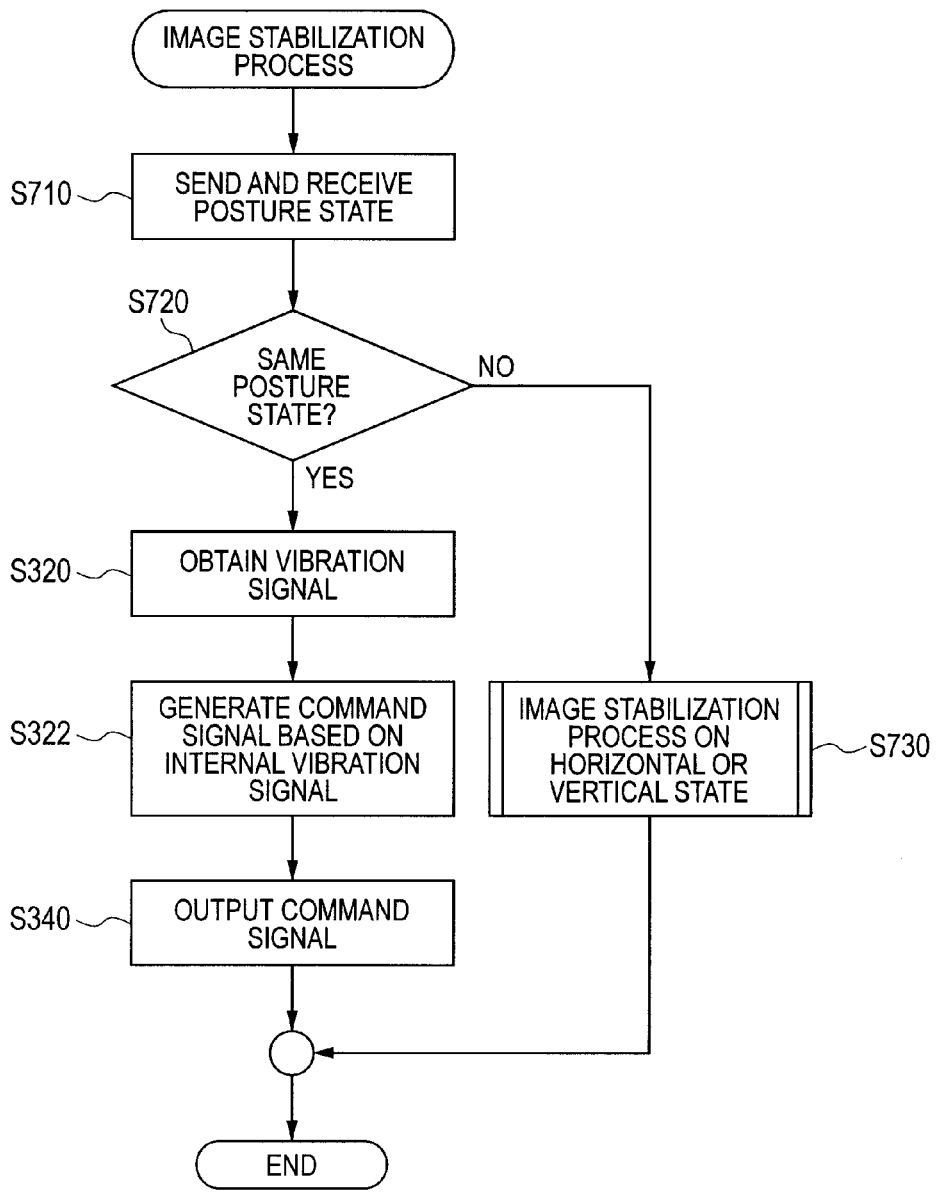
FIG. 7 is a flow chart of an image stabilization process in a third embodiment.
Figure 8:
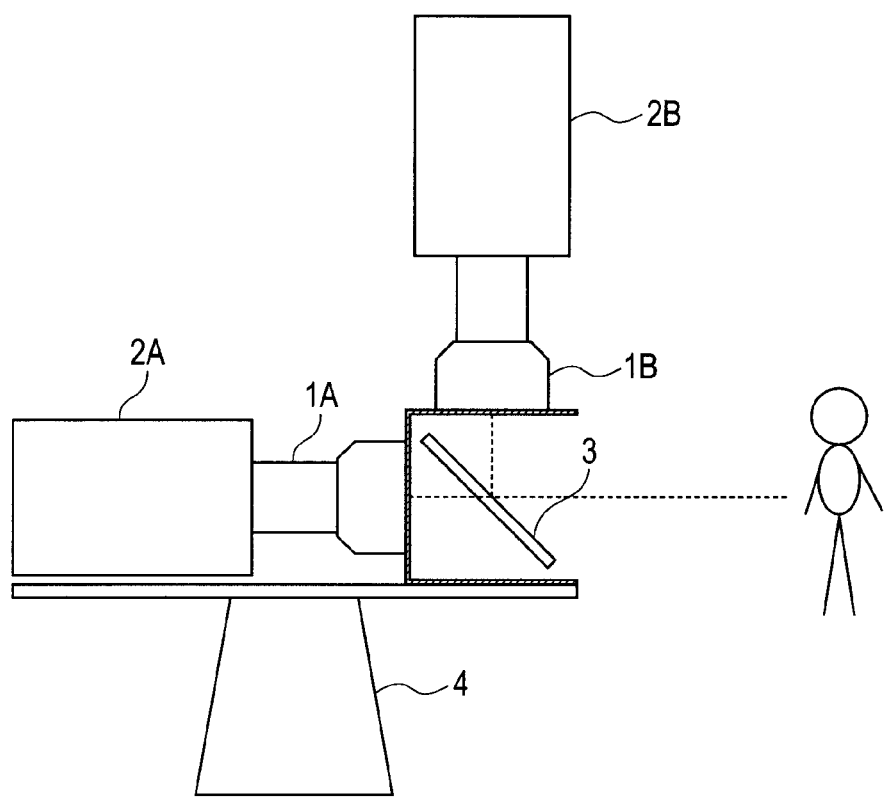
FIG. 8 illustrates an outer appearance of a stereoscopic image taking system according to a prior art.

FIG. 7 is a flow chart of an image stabilization process executed in the image stabilization controllers 122A, 122B. The process steps same as those in FIG. 3 described in the first embodiment are designated by the same step numbers and will not be further described.

In the following, the process in the image stabilization unit 10A will be described by way of illustration.

In step S710, information indicating the installing direction determined by the installing direction determination process that has been described with reference to FIG. 2 is sent to the other image stabilization unit through the communication unit 123A, and information indicating the installing direction is received from the other image stabilization unit. Then in step S720, it is determined whether the installing direction determined by the posture determination unit 121A and the installing direction of the other image stabilization unit indicated by the information received in step S710 are the same or not. If the installing directions are different, the process proceeds to step S730. If the installing directions are the same, the process proceeds to step S320. In step S730, a series of process steps that have been described with reference to FIG. 3 are executed, wherein a vibration signal is sent or received in accordance with the installing direction, and image blur correction is performed. If the installing directions are the same, the process of steps S320 through S340 are executed, wherein a vibration signal is not sent nor received, and image blur correction is performed based on the vibration signal output from its own vibration detector 110A of the image stabilization unit (i.e. based on the internal vibration signal).

When the installing directions of the two lens apparatuses are the same, the lens apparatuses are arranged parallel in the image taking system. In this case, image blur correction can be performed based on the vibration signals output from the vibration detectors 110A, 110B of the respective lens apparatuses, because beams coming from the object entering the two lens apparatuses have not been deflected by a half mirror.

As described above, in this embodiment it is determined whether the installing directions of the two lens apparatuses are the same or not, and the process is changed based on the determination. Thus, the process can be adapted to both the image taking system in which the lens apparatuses are arranged parallel and the image taking system in which the lens apparatuses are arranged perpendicularly.

Although in this embodiment a case in which image blur correction that is performed based on the vibration signals obtained in the respective vibration detectors 110A, 110B have been described, the present invention is not limited by this. For example, the use of the vibration signals of the both the vibration detectors enables a reduction in the effect of noises as has been described in the description of the second embodiment. Since when the installing directions of the lens apparatuses are the same, the directions of the vibration axes in the H direction and the V directions are the same in the two image stabilization units, image blur correction may be performed using the vibration signals of both the image stabilization units for both the H and V directions.

In the above described embodiment, a movable lens unit that displaces in directions perpendicular to the optical axis to shift the image on the image plane is used to constitute the image blur reduction unit that reduces image blur caused by vibration of the lens apparatus. However, the present invention is not limited by this. The present invention can be applied to a system using any unit, such as a variable apex angle prism (VAP) that can shift the image position in directions perpendicular to the optical axis and can achieve the same effects with such a unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194626, filed Aug. 31, 2010, which is hereby incorporated by reference herein in its entirety.

What is claimed is:

1. An image taking system comprising:
an optical path splitting element that splits beams coming from an object into transmitted beams and reflected beams; and
first and second lens apparatuses into which the two bundles of beams split by the optical path splitting element enter,
wherein each of the first and second lens apparatuses comprises an image blur reduction unit that shifts an object image in a direction perpendicular to the optical axis to reduce image blur, a vibration detector that detects vibration of the lens apparatus, a command signal generator that generates a command signal for driving the image blur reduction unit, a driving unit that drives the image blur reduction unit based on the command signal, and a communication unit that sends/receives image stabilization information generated by the vibration detector to/from the other lens apparatus, and
the command signal generator of the second lens apparatus generates a command signal based on the image stabilization information obtained from the first lens apparatus through the communication unit.

2. An image taking system according to claim 1, wherein, the vibration detectors of the first and second lens apparatuses respectively detect vibration in two directions that are perpendicular to the optical axis and perpendicular to each other, one of the two directions being a first direction that is perpendicular to the optical axis of the first lens apparatus and the optical axis of the second lens apparatus,
the command signal generator of the first lens apparatus generates a command signal based on a vibration signal obtained by the vibration detector and image stabilization information obtained through the communication unit from the second lens apparatus for vibration in the first direction, and generates a command signal based on the vibration signal obtained by the vibration detector of the first lens apparatus for vibration in a second direction that is perpendicular to the first direction, and
the command signal generator of the second lens apparatus generates a command signal based on a vibration signal obtained by the vibration detector of the second lens apparatus and image stabilization information obtained through the communication unit from the first lens apparatus for vibration in the first direction and for vibration in a third direction that is perpendicular to the first direction.

3. An image taking system according to claim 1, wherein,
the absolute value of an elevation angle of the optical axis of the first lens apparatus is smaller than 45 degrees, and the absolute value of an elevation angle of the optical axis of the second lens apparatus is larger than 45 degrees,
each of the first and second lens apparatuses has a movable optical element that is movable in the direction of the optical axis and an installing direction determination unit that determines whether the lens apparatus is installed as the first lens apparatus or as the second lens apparatus based on any one of an absolute value of an actuation current amount for driving the movable optical member, a forward-backward difference in an absolute value of the actuation current amount during forward and backward driving of the movable optical member, and a driving speed.

4. An image taking system according to claim 1, wherein,
An absolute value of the elevation angle of the optical axis of the first lens apparatus is smaller than 45 degrees, and the absolute value of an elevation angle of the optical axis of the second lens apparatus is larger than 45 degrees,
each of the first and second lens apparatuses has an acceleration sensor and an installing direction determination unit that determines whether the lens apparatus is installed as the first lens apparatus or as the second lens apparatus based on an output from the acceleration sensor.

5. An image taking system according to claim 1, wherein,
the first lens apparatus is installed in such a way that its optical axis is oriented horizontally, and the second lens apparatus is installed in such a way that its optical axis is oriented vertically,
the image blur reduction unit includes a shift optical element which is movable in a direction perpendicular to the optical axis,
each of the first and second lens apparatuses has a movable optical element that is movable in the direction of the optical axis, a driving control stop unit that stops control of the driving unit that drives the image blur reduction unit, and an installing direction determination unit that determines whether the lens apparatus is installed as the first lens apparatus or as the second lens apparatus based on a displacement of the shift optical element or the movable optical element upon stopping of control by the driving control stop unit.

6. An image taking system according to claim 1, wherein the first and second lens apparatuses have the same specifications, each of the first and second lens apparatuses has an installing direction setting unit that sets the installing direction, and a determination as to whether the lens apparatus is installed as the first lens apparatus or as the second lens apparatus is made based on the setting in the installing direction setting unit.

7. An image taking system according to claim 1, wherein the image stabilization information comprises the vibration signal, the command signal or a position signal of the image blur reduction unit.

8. A lens apparatus for use as the first lens apparatus or the second lens apparatus in the image taking system according to claim 1.

* * * * *